US012607832B2

(12) United States Patent (10) Patent No.: US 12,607,832 B2
Lin et al. (45) Date of Patent: Apr. 21, 2026

(54) IMAGING LENS

(71) Applicant: Young Optics Inc., Hsinchu Science Park (TW)

(72) Inventors: Ying-Hsiu Lin, Hsinchu Science Park (TW); Chia-Chen Kung, Hsinchu Science Park (TW); Ching-Lung Lai, Hsinchu Science Park (TW)

(73) Assignee: Young Optics Inc., Hsinchu Science Park (TW)

( * ) Notice: Subject to any disclaimer, the term of this patent is extended or adjusted under 35 U.S.C. 154(b) by 330 days.

(21) Appl. No.: 18/436,916

(22) Filed: Feb. 8, 2024

(65) Prior Publication Data

US 2024/0345373 A1 Oct. 17, 2024

(30) Foreign Application Priority Data

Apr. 12, 2023 (TW) ................................. 112113741

(51) Int. Cl.
*G02B 13/18* (2006.01)
*G02B 9/04* (2006.01)
(52) U.S. Cl.
CPC ............... *G02B 13/18* (2013.01); *G02B 9/04* (2013.01)

(58) Field of Classification Search
CPC .................................. G02B 13/18; G02B 9/04
See application file for complete search history.

(56) References Cited

U.S. PATENT DOCUMENTS

2021/0026104 A1* 1/2021 Lee ........................... G02B 3/04
2021/0373286 A1* 12/2021 Lin ....................... G02B 13/004

* cited by examiner

*Primary Examiner* — Nathanael R Briggs
(74) *Attorney, Agent, or Firm* — MUNCY, GEISSLER, OLDS & LOWE, P.C.

(57) ABSTRACT

An imaging lens includes a first lens group and a second lens group. The first lens group includes three lenses with refractive powers, where two of three lenses of the first lens group are aspheric lenses. The second lens group includes three lenses with refractive powers, where one of three lenses is an aspheric lens and other two lenses are paired to form a doublet lens. The imaging lens satisfies conditions of 3.0<LT/IMH<3.5 and 1.0<D1/LT<1.08, where IMH is a semi-diagonal image height of the imaging lens, D1 is a lens diameter of a lens closest to an object side of the imaging lens, and LT is a distance measured along an optical axis between two outermost lens surfaces with refractive powers at opposite ends of the imaging lens.

20 Claims, 15 Drawing Sheets

IMAGING LENS

CROSS-REFERENCE TO RELATED APPLICATION

This application claims the priority benefit of Taiwan application serial no. 112113741, filed Apr. 12, 2023. The entirety of the above-mentioned patent application is hereby incorporated by reference herein and made a part of this specification.

BACKGROUND

Field of the Invention

The invention relates to an imaging lens.

Description of the Related Art

In recent years, electronic products with imaging capabilities have been applied in various fields, such as security surveillance, in-vehicle camera systems, and action cameras. Therefore, it is desirable to provide an imaging lens that achieves wide viewing angles, miniaturization, and high imaging quality. However, conventional wide-angle lenses, due to limitations in lens shape and material, tend to be bulky and difficult to provide high imaging quality, and often lead to the problem of purple fringing due to significant chromatic aberrations.

BRIEF SUMMARY OF THE INVENTION

In order to achieve one or a portion of or all of the objects or other objects, one embodiment of the invention provides an imaging lens including a first lens group and a second lens group, and the first lens group and the second lens group are divided from each other by an aperture stop. The first lens group includes three lenses with refractive powers, where two of three lenses of the first lens group are aspheric lenses. The second lens group includes three lenses with refractive powers, where one of three lenses is an aspheric lens and other two lenses are paired to form a doublet lens. The imaging lens includes six lenses with refractive powers and includes at least two plastic lenses. The imaging lens satisfies conditions of 3.0<LT/IMH<3.5 and 1.0<D1/LT<1.08, where IMH is a semi-diagonal image height of the imaging lens, D1 is a lens diameter of a lens closest to an object side of the imaging lens, and LT is a distance measured along an optical axis between two outermost lens surfaces with refractive powers at opposite ends of the imaging lens.

Another embodiment of the invention provides an imaging lens including a first lens, a second lens, a third lens, a fourth lens, a fifth lens and a sixth lens with refractive powers arranged in order from an object side to an image side of the imaging lens. The second lens, the third lens, the fifth lens and the sixth lens are aspheric lenses, the fifth lens and the sixth lens are paired to form a doublet lens, the first lens is closest to the object side among all lenses of the imaging lens, and the sixth lens is closest to the image side among all lenses of the imaging lens. The imaging lens satisfies conditions of 3.0<LT/IMH<3.5 and 1.0<D1/LT<1.08, where IMH is the semi-diagonal image height, D1 is the diameter of the first lens, LT is a length measured along an optical axis of the imaging lens from an object-side surface of the first lens to an image-side surface of the sixth lens.

Through the designs of various embodiments of the invention, meeting the designed characteristics and arrangement of optical components set forth in the above may, under the condition of possessing a wide field of view, achieve good imaging quality for both visible and infrared light and may resolve the issue of significant purple fringing during imaging. Further, in various embodiments of the invention, the glass/plastic lenses and spherical/aspheric lenses are well matched to achieve a wide range of operating temperature, low fabrication costs and improved imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The term "lens" refers to an element made from a partially or entirely light-penetrable material with optical power. The material commonly includes plastic or glass.

In an imaging system, an object side may refer to one side of an optical path of an imaging lens comparatively near a subject to be picked-up, and an image side may refer to other side of the optical path comparatively near a photosensor.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
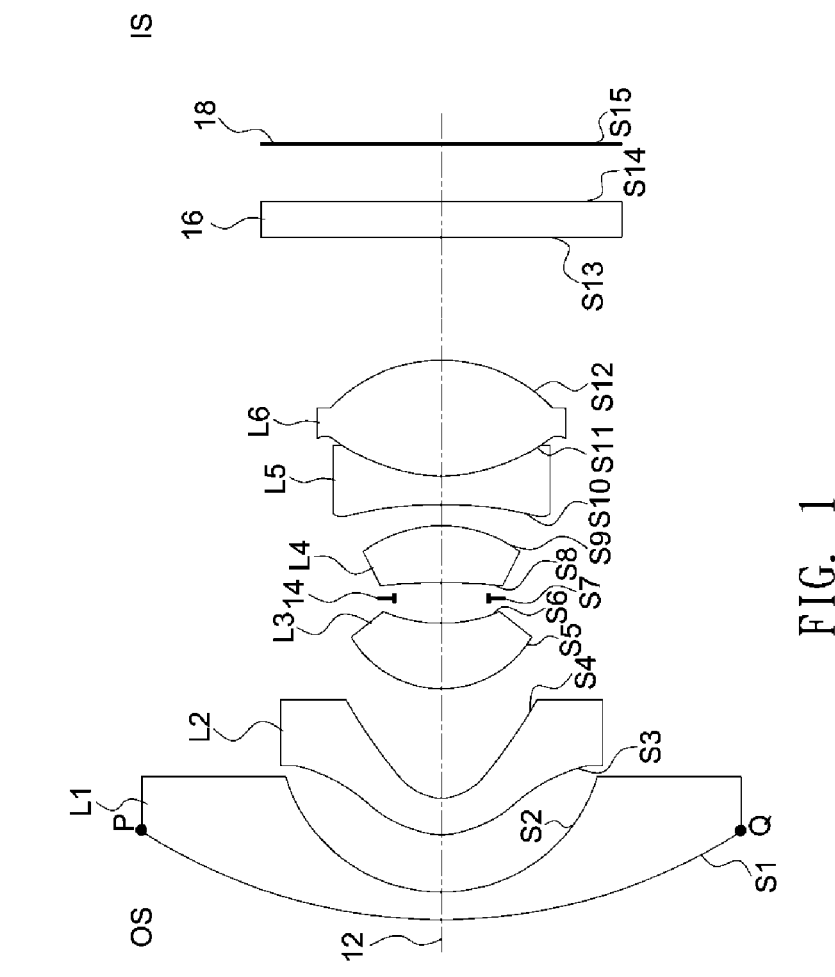
FIG. 1 shows a schematic diagram of an imaging lens according to a first embodiment of the invention.

FIG. 1 shows a schematic diagram of an imaging lens according to a first embodiment of the invention. As shown in FIG. 1, in this embodiment, an imaging lens 10a includes a first lens group G1, a second lens group G2, and an aperture stop 14 disposed between the first lens group G1 and the second lens group G2. The first lens group G1 has a negative refractive power and includes a lens L1, a lens L2 and a lens L3 arranged in order from an object side OS to an image side IS of the imaging lens 10a. The second lens group G2 has a positive refractive power and includes a lens L4, a lens L5 and a lens L6 arranged in order from the object side OS to the image side IS. Additionally, a cover plate 16 and an image sensor (not shown) can be arranged on the image side IS. The cover plate 16 may be fabricated from any suitable light-penetrable material, such as glass. The cover plate 16 may serve to adjust the overall length of an imaging lens and provide a protective function. An image plane of the imaging lens 10a on the image sensor is denoted as 18. The aperture stop 14 is a light-blocking element that limits the amount of light passing through the imaging lens. In one embodiment, the aperture stop 14 is an independent optical element; in another embodiment, the aperture stop 14 is defined by an inner diameter of a lens barrel. Light from a subject to be captured may enter the imaging lens 10a and pass through the lens L1, the lens L2, the lens L3, the aperture stop 14, the lens L4, the lens L5, the lens L6 and the cover plate 16 in succession, and finally forms an image on the image plane 18.

In each of the following embodiments, the object side OS is located on the left side and the image side IS is located on the right side of each figure, and thus this is not repeatedly described in the following for brevity. In this embodiment, the aperture stop 14 is disposed between the lens L2 and the lens L4, and refractive powers of the lens L1 to the lens L6 are respectively negative, negative, positive, positive, negative, and positive. In this embodiment, the lenses L1 and L4 are glass spherical lenses, and the lenses L2, L3, L5 and L6 are plastic aspheric lenses. However, the invention is not restricted to such configuration. In this embodiment, the lens L5 and the lens L6 are paired together, such as being cemented to each other, to form a doublet lens to reduce chromatic aberrations and improve the manufacturing yield rate of the imaging lens 10a.

In at least some embodiments of the invention, the first lens group G1 may include three lenses with refractive powers where two of the three lenses are aspheric lenses, and the second lens group G2 may include three lenses with refractive powers where one of three lenses is an aspheric lens and other two lenses form a cemented doublet. Furthermore, a length measured from the lens surface closest to the object side OS to the aperture stop 14 along the optical axis 12 can be greater than a length measured from the lens surface closest to the image side IS to the aperture stop 14 along the optical axis 12. In various embodiments of the invention, the number, shape, and optical characteristics of lenses may vary according to actual needs without limitation.

Each lens may be assigned a parameter of "lens diameter". For example, as shown in FIG. 1, the lens L1 has an object-side surface S1 and an image-side surface S2, each lens surface defines two outermost edge turning points P and Q at opposite ends of the optical axis 12, and a maximum distance between the two edge turning points P and Q in the direction perpendicular to the optical axis 12 is referred to as a lens diameter. In other words, the lens diameter is a mechanical outside diameter of a lens, which encompasses the entire span covering a clear aperture (CA) that is required for all light to pass through and an extension part that contributes to the optical-mechanical property of the lens. In this embodiment, a maximum clear aperture of the lens L1 (closest to the object side OS among all lenses of the imaging lens 10a) is 11.8 mm, a lens diameter of the lens L1 is 12.2 mm, a maximum clear aperture of the lens L6 (closest to the image side IS among all lenses of the imaging lens 10a) is 5 mm, and a lens diameter of the lens L6 is 9 mm. In at least some embodiments, the imaging lens may satisfy conditions of $1.0 < D1/LT < 1.08$ and $0.76 < DL/LT < 1.02$, where D1 is a lens diameter of the lens closest to the object side OS of the imaging lens (such as the lens L1), DL is a lens diameter of the lens closest to the image side IS of the imaging lens (such as the lens L6), and LT is a total lens length that is a distance measured along the optical axis 12 between two outermost lens surfaces with refractive powers at opposite ends of the image lens (such as the object-side surface S1 of the lens L1 and the image side surface S12 of the lens L6 shown in FIG. 1). Meeting the condition of $1.0 < D1/LT < 1.08$ may facilitate light converging capability of lenses to allow for better optical performance in a limited space, and meeting the condition of $0.76 < DL/LT < 1.02$ may enhance light collection to allow for better optical performance. In this embodiment for the imaging lens 10a, D1=12.2 mm, DL=9 mm, LT=11.43 mm, D1/LT=1.067 and DL/LT=0.787.

In at least some embodiments of the invention, the imaging lens may satisfy a condition of $3.0 < LT/IMH < 3.5$, where LT denotes a distance measured along the optical axis 12 between two outermost lens surfaces with refractive powers at opposite ends of the image lens (such as the object-side surface S1 of the lens L1 and the image side surface S12 of the lens L6 shown in FIG. 1), and IMH denotes a semi-diagonal image height on an image plane, which equals half of an image circle diameter. Meeting the above condition may achieve a balance between miniaturization and optical performance. In this embodiment for the imaging lens 10a, IMH=3.7 mm, and LT/IMH=3.089.

The diagonal field of view (DFOV) refers to the light collection angle of the optical surface closest to the object side OS, namely a full field of view measured diagonally. In at least some embodiments of the invention, the DFOV may range from 170 degrees to 220 degrees. In this embodiment, the DFOV of the imaging lens 10a is 180 degrees. Furthermore, in at least some embodiments of the invention, a total track length TTL of the imaging lens (a length measured from the object-side surface of lens L1 to the image plane 18 along the optical axis 12) may range from 14.6 mm to 16 mm.

Detailed optical data and design parameters of the optical lens 10a are shown in Table 1 below. Note the data provided below are not used for limiting the invention, and those skilled in the art may suitably modify parameters or settings of the following embodiment with reference of the invention without departing from the scope or spirit of the invention.

Table 1 lists the values of parameters for each lens of an imaging system. The radius of curvature and interval shown in Table 1 are all in a unit of mm. The field heading "radius of curvature" shown in Table 1 is a reciprocal of the curvature. When a lens surface has a positive radius of curvature, the center of the lens surface is located towards the image side. When a lens surface has a negative radius of curvature, the center of the lens surface is located towards the object side. The field heading "interval" represents a distance between two adjacent surfaces along the optical axis 12 of the imaging lens 10a. For example, an interval of the surface S1 is a distance between the surface S1 and the surface S2 along the optical axis 12, and an interval of the surface S2 is a distance between the surface S2 and the surface S3 along the optical axis 12. Further, the interval, refractive index and Abbe number of any lens listed in the column of "Object description" show values in a horizontal row aligned with the position of that lens, so that related descriptions are omitted for sake of brevity.

TABLE 1

| Object description | Surface | Radius of curvature(mm) | Interval (mm) | Refractive index (nd) | Abbe number (Vd) |
|---|---|---|---|---|---|
| Lens L1(meniscus) | S1 | 12.221 | 0.60 | 1.83 | 42.7 |
| | S2 | 3.605 | 1.17 | | |
| Lens L2(aspheric) | S3 | 1.956 | 0.79 | 1.54 | 55.7 |
| | S4 | 1.095 | 2.13 | | |
| Lens L3(aspheric) | S5 | 4.178 | 1.41 | 1.67 | 20.4 |
| | S6 | 13.813 | 0.48 | | |
| Aperture stop 14 | S7 | INF | 0.32 | | |
| Lens L4(meniscus) | S8 | −50.808 | 1.24 | 1.80 | 46.5 |
| | S9 | −3.149 | 0.206 | | |
| Lens L5(aspheric) | S10 | −9.559 | 0.59 | 1.67 | 20.4 |
| Lens L6(aspheric) | S11 | 2.731 | 2.495 | 1.54 | 55.7 |
| | S12 | −2.844 | 2.33 | | |
| cover plate 16 | S13 | INF | 0.70 | 1.52 | 64.2 |
| | S14 | INF | 1.136 | | |
| Image plane 18 | S15 | INF | 0 | | |

An aspheric lens indicates at least one of its front lens surface and rear lens surface has a radius of curvature that varies along a center axis to correct abbreviations. In the following design examples of the invention, each aspheric surface satisfies the following equation:

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + \dots ,$$

where Z denotes a sag of an aspheric surface along the optical axis 12, c denotes a reciprocal of a radius of an osculating sphere, K denotes a conic constant, r denotes a height of the aspheric surface measured in a direction perpendicular to the optical axis 12, and parameters A-G are 4th, 6th, 8th, 10th, 12th, 14th and 16th order aspheric coefficients. Note the data provided below are not used for limiting the invention, and those skilled in the art may suitably modify parameters or settings of the following embodiment with reference of the invention without departing from the scope or spirit of the invention.

6 the above embodiment of the optical lens 10*a* may achieve good imaging quality for both visible and infrared light.

In at least some embodiments of the invention, a distance between a focal plane for blue-violet light with a wavelength of 450 nm and a focal plane for visible light with a wavelength of 555 nm along the optical axis of the imaging lens is no more than 10 um. Because the distance between the focal plane for green light (555 nm; most sensitive to human vision) and the focal plane for blue-violet light (450 nm) is considerably small (≤10 um), these two spectral lights are focused at almost the same point on a plane. Thus, the embodiments of the invention may resolve the common optical problem of purple fringing. Furthermore, in at least some embodiments of the invention, a distance between a focal plane for infrared light with a wavelength of 850 nm and a focal plane for visible light with a wavelength of 555 nm along the optical axis of the imaging lens is no more than 15 um to achieve good imaging quality for both visible and infrared light.

Figure 4:
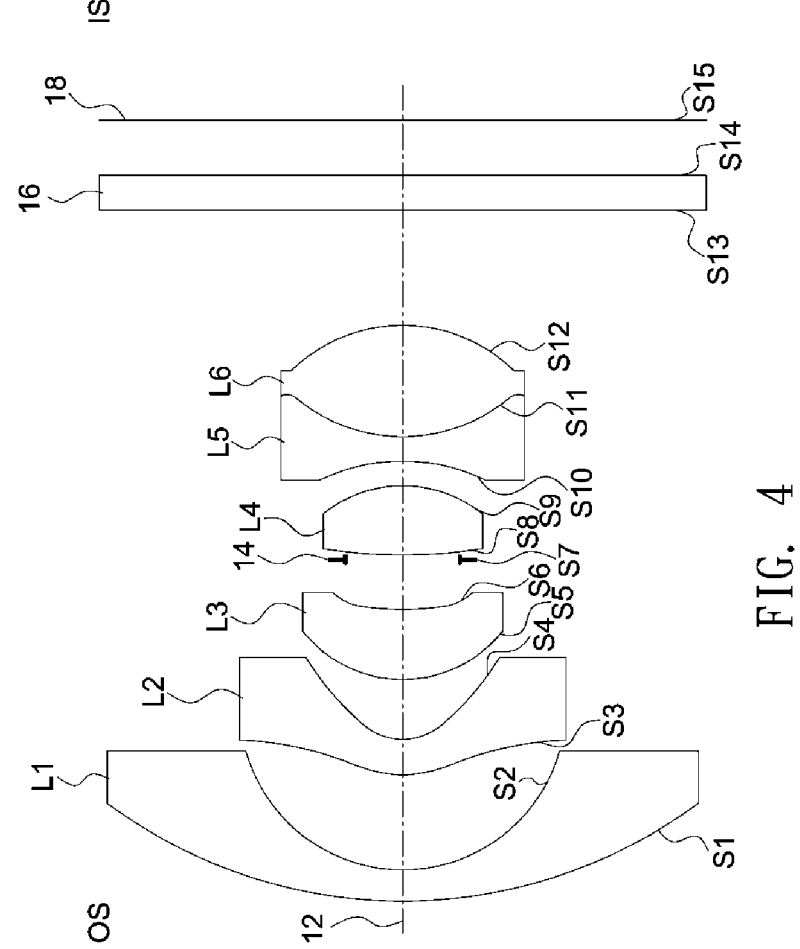
FIG. 4 shows a schematic diagram of an imaging lens according to a second embodiment of the invention.

FIG. 4 is a schematic diagram of an imaging lens according to a second embodiment of the invention. In this embodiment, the imaging lens 10*b* includes a lens L1, a lens L2, a lens L3, a lens L4, a lens L5 and a lens L6 with refractive powers arranged in order from the object side OS to the image side IS, and the imaging lens 10*b* includes an

TABLE 2

| | K | A | B | C | D | E | F | G |
|---|---|---|---|---|---|---|---|---|
| S3 | 0.9695 | 4.74E−03 | 8.47E−04 | −2.35E−03 | 5.64E−04 | −6.09E−05 | 3.26E−06 | −7.06E−08 |
| S4 | −0.93819 | 3.86E−02 | −3.40E−03 | −5.50E−03 | 9.11E−04 | 2.24E−04 | −7.47E−05 | 5.81E−06 |
| S5 | 1.070143 | 1.79E−02 | −3.83E−05 | 1.56E−03 | −6.61E−04 | 1.71E−04 | −1.59E−05 | 0 |
| S6 | 0 | 2.81E−02 | 5.32E−03 | 1.43E−04 | 7.29E−04 | 2.74E−04 | 0 | 0 |
| S10 | −1.04E−16 | −1.13E−02 | 2.32E−03 | 1.79E−04 | −7.40E−05 | 7.42E−06 | 0 | 0 |
| S11 | −9.41449 | 1.09E−02 | −5.30E−03 | 2.69E−03 | −6.13E−04 | 6.77E−05 | −3.16E−06 | 0 |
| S12 | −2.03894 | −4.04E−03 | −8.65E−04 | 5.57E−04 | −1.88E−04 | 3.98E−05 | −4.69E−06 | 2.42E−07 |

Figure 2A:
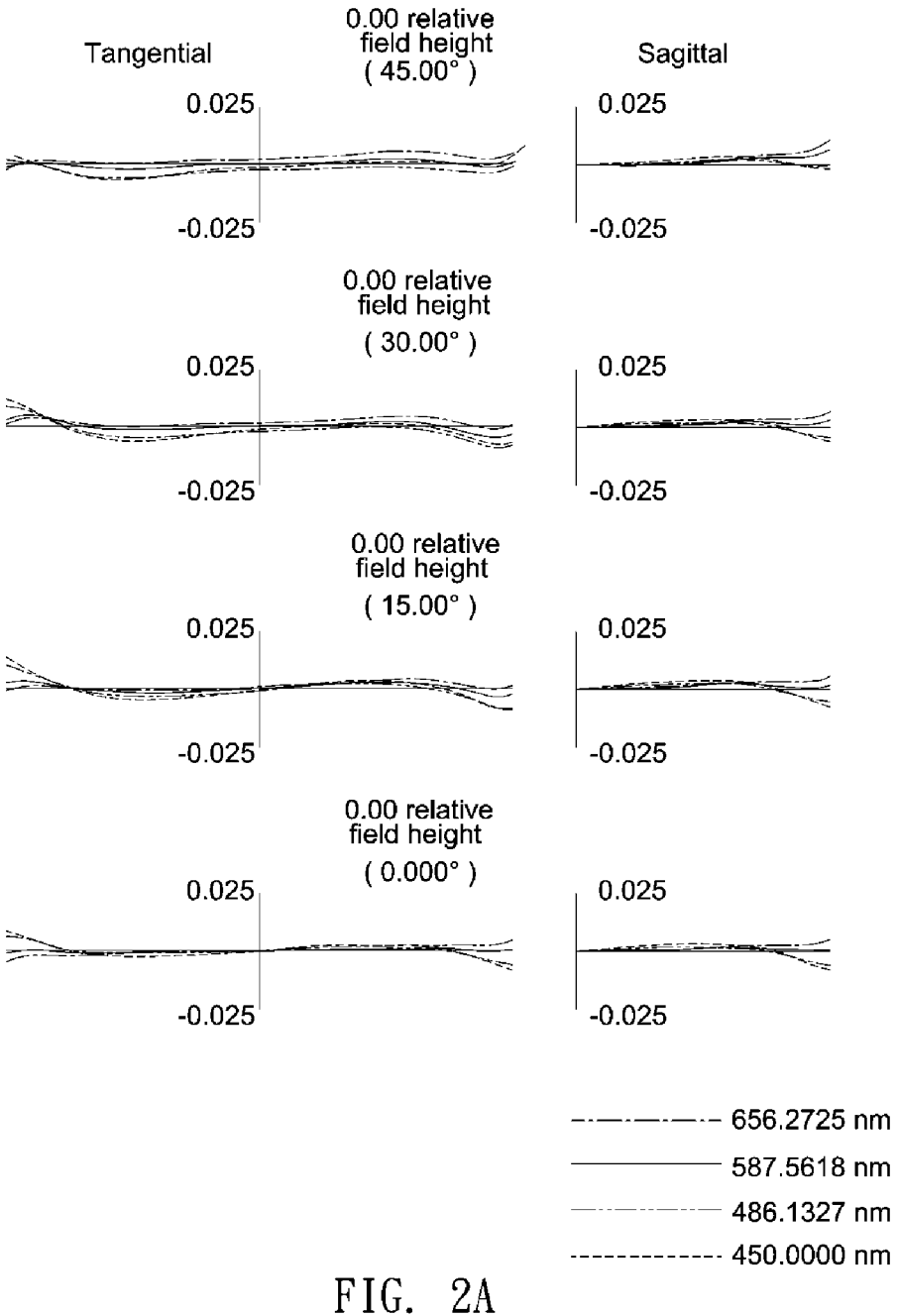
FIG. 2A and FIG. 2B show visible-light ray fan plots of the imaging lens shown in FIG. 1.
Figure 2B:
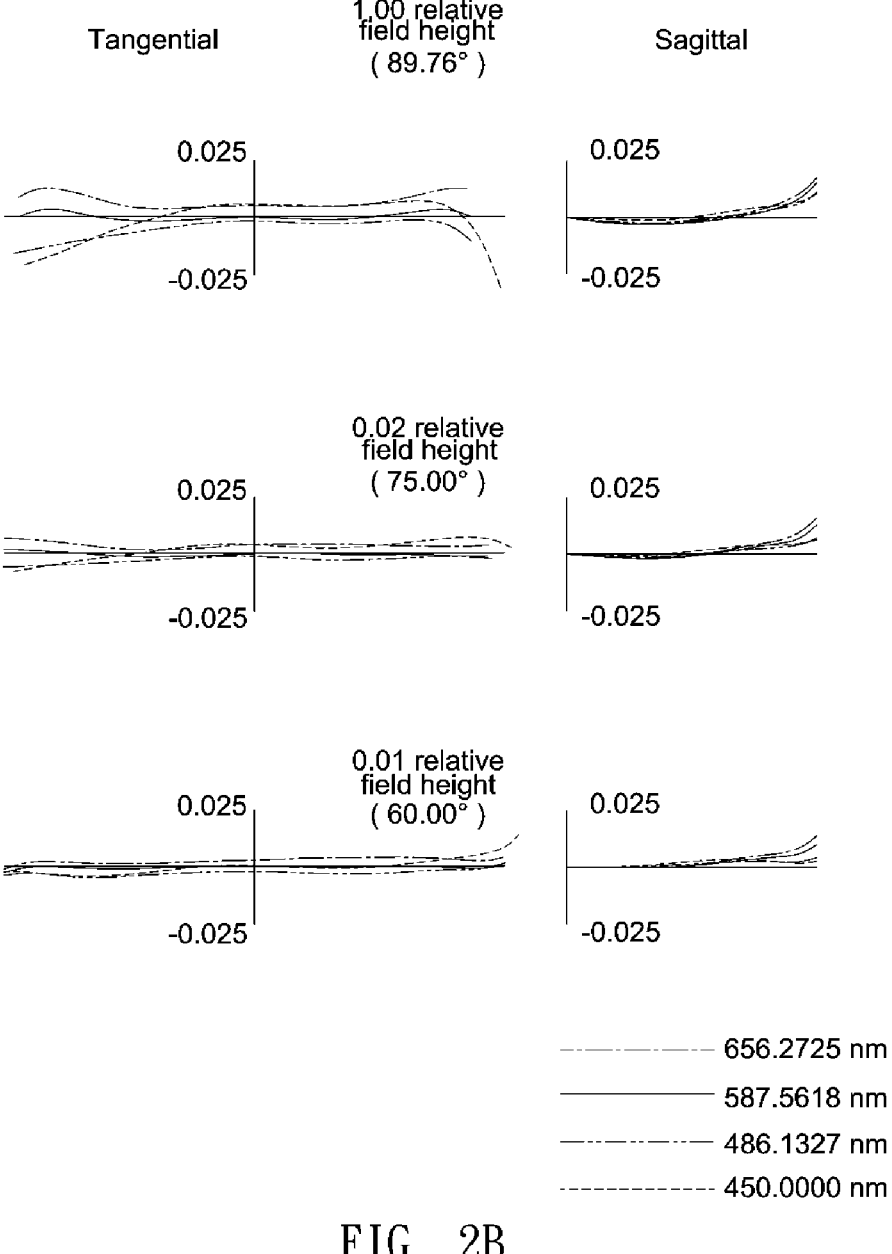
Figure 3A:
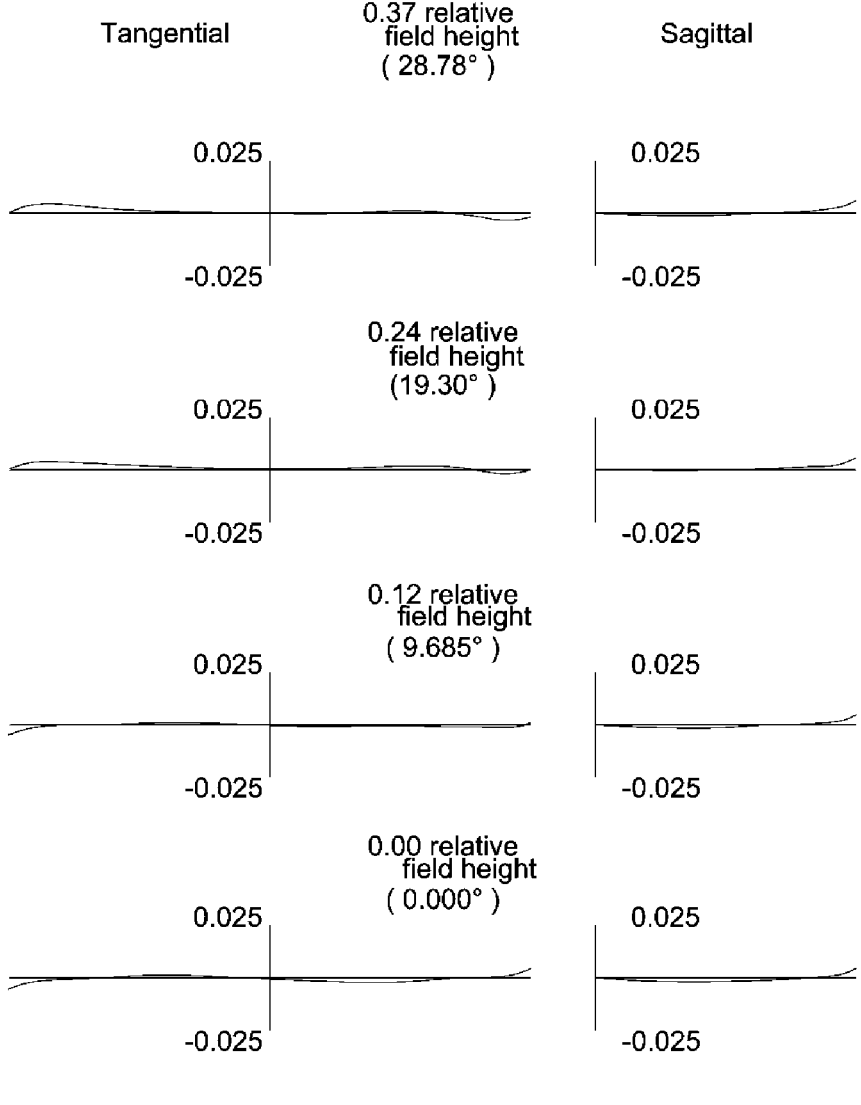
FIG. 3A and FIG. 3B show infrared-light ray fan plots of the imaging lens shown in FIG. 1.
Figure 3B:
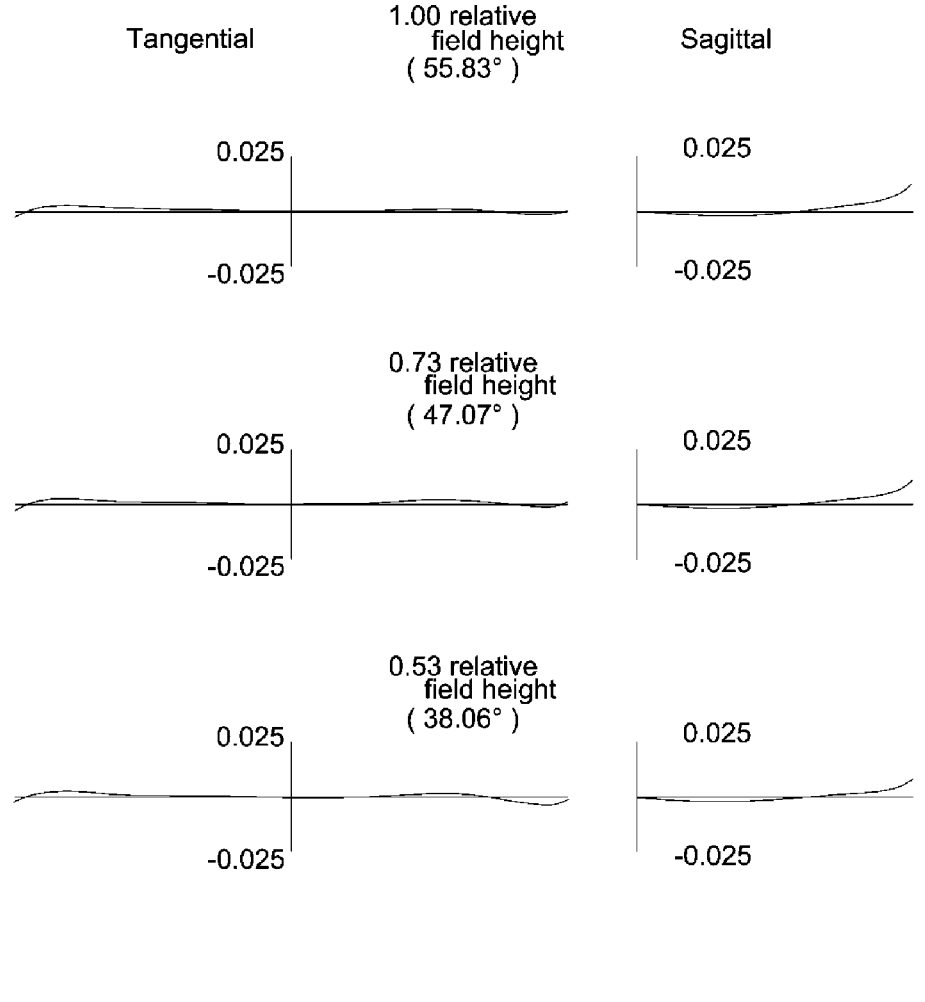

FIG. 2A, FIG. 2B, FIG. 3A and FIG. 3B show optical simulation results of the imaging lens 10*a*. FIG. 2A and FIG. 2B show ray fan plots for visible light, and FIG. 3A and FIG. 3B show ray fan plots for infrared light (850 nm), where an abscissa of the plot represents entrance pupil positions, and an ordinate of the plot represents relative numerical values of positions on an image plane where chief rays are projected. The optical simulation results for visible light and infrared light imaging shown in these plots are within permitted ranges specified by the standard, which indicates aperture stop 14 disposed between the lens L3 and the lens L4. The refractive powers of the lenses L1 to the lens L6 are respectively negative, negative, positive, positive, negative, and positive. In this embodiment, the lenses L1 and L4 are glass spherical lenses, and the lenses L2, L3, L5, and L6 are plastic aspheric lenses, but the invention is not limited thereto. In this embodiment, the lens L5 and the lens L6 are paired together, such as being cemented to each other, to form a doublet lens to reduce chromatic aberrations of the imaging lens 10b and allow for more relaxed tolerances in manufacturing the imaging lens 10b to thus improve the yield rate.

In this embodiment, the imaging lens 10b consists essentially of six lenses with refractive powers. The diagonal field of view (DFOV) of the imaging lens 10b is 180 degrees, the semi-diagonal image height is 3.7 mm, the lens diameter D1 of the lens closest to the object side OS is 12.1 mm, the lens diameter DL of the lens closest to the image side IS is 8.85 mm, the total lens length LT is 11.48 mm, D1/LT=1.054, DL/LT=0.771, and LT/IMH=3.103.

Detailed optical data and design parameters of the lenses and other optical components of the imaging lens 10b are shown in Table 3.

Figure 7:
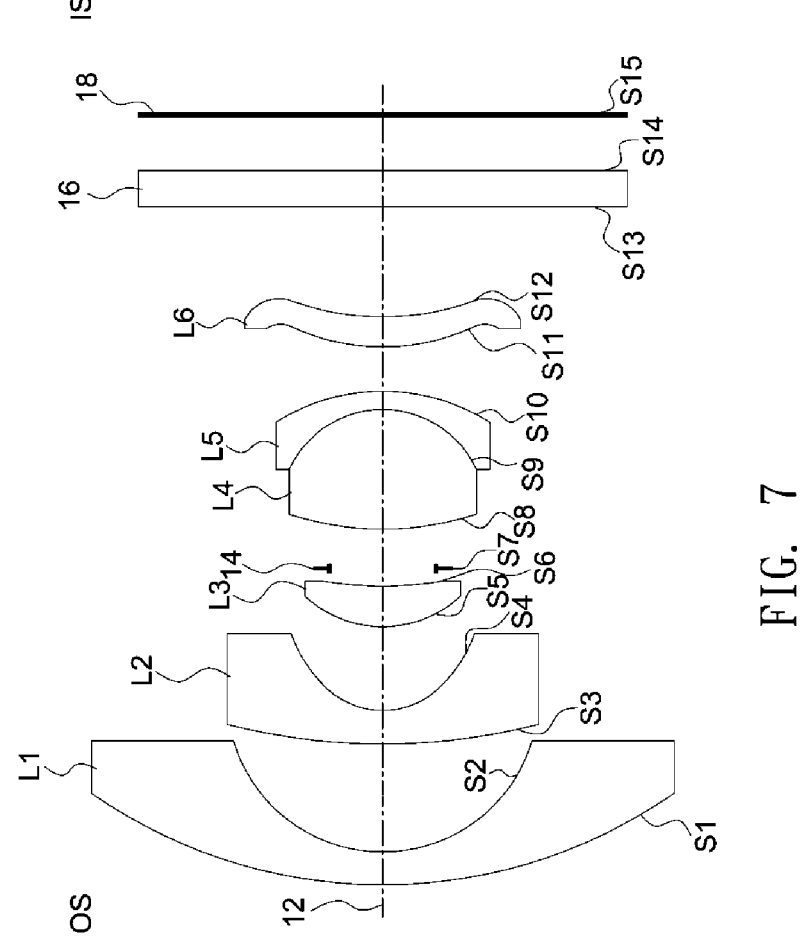
FIG. 7 shows a schematic diagram of an imaging lens according to a third embodiment of the invention.

FIG. 7 is a schematic diagram of an imaging lens according to a third embodiment of the invention. In this embodiment, the imaging lens 10c includes a lens L1, a lens L2, a lens L3, a lens L4, a lens L5 and a lens L6 with refractive powers arranged in order from the object side OS to the image side IS, and the imaging lens 10c includes an aperture stop 14 disposed between the lens L3 and the lens L4. The refractive powers of the lenses L1 to the lens L6 are respectively negative, negative, positive, positive, negative, and positive. In this embodiment, the lenses L1, L4 and L5 are glass spherical lenses, and the lenses L2, L3 and L6 are plastic aspheric lenses, but the invention is not limited

TABLE 3

| Object description | Surface | Radius of curvature(mm) | Interval (mm) | Refractive index (nd) | Abbe number (Vd) |
|---|---|---|---|---|---|
| Lens L1(meniscus) | S1 | 11.734 | 0.60 | 1.83 | 37.3 |
| | S2 | 3.666 | 1.93 | | |
| Lens L2(aspheric) | S3 | 2.475 | 0.69 | 1.54 | 55.7 |
| | S4 | 1.161 | 1.19 | | |
| Lens L3(aspheric) | S5 | 4.739 | 1.41 | 1.67 | 19.2 |
| | S6 | 14.488 | 0.99 | | |
| Aperture stop 14 | S7 | INF | 0.10 | | |
| Lens L4(bi-convex) | S8 | 13.768 | 1.39 | 1.81 | 40.7 |
| | S9 | −3.090 | 0.47 | | |
| Lens L5(aspheric) | S10 | −6.486 | 0.50 | 1.67 | 20.4 |
| Lens L6(aspheric) | S11 | 2.727 | 2.20 | 1.54 | 55.7 |
| | S12 | −3.011 | 2.30 | | |
| cover plate 16 | S13 | INF | 0.7 | 1.52 | 64.2 |
| | S14 | INF | 1.12 | | |
| Image plane 18 | S15 | INF | 0 | | |

Table 4 shows the conic constant K and aspheric coefficients A-G for each aspheric surface of the imaging lens 10b.

thereto. In this embodiment, the lens L4 and the lens L5 are paired together, such as being cemented to each other, to

TABLE 4

| | K | A | B | C | D | E | F | G |
|---|---|---|---|---|---|---|---|---|
| S3 | −4.47223 | 5.74E−03 | −8.54E−03 | 2.23E−03 | −2.99E−04 | 2.27E−05 | −9.23E−07 | 1.55E−08 |
| S4 | −1.09232 | −5.14E−03 | −3.62E−03 | −1.95E−03 | 1.76E−03 | −3.87E−04 | 2.83E−05 | 0 |
| S5 | −0.75895 | 1.55E−02 | 1.60E−03 | −8.24E−04 | 3.76E−04 | −4.61E−05 | 0 | 0 |
| S6 | 86.18603 | 1.72E−02 | 4.88E−03 | −1.22E−03 | 8.76E−04 | 0 | 0 | 0 |
| S10 | −8.44086 | −1.81E−02 | 3.91E−03 | −5.76E−04 | −7.76E−05 | 2.12E−05 | 0 | 0 |
| S11 | −5.64848 | −1.19E−02 | 1.07E−02 | −2.59E−03 | 3.00E−04 | −1.60E−05 | 0 | 0 |
| S12 | −2.23956 | −2.74E−03 | −5.09E−04 | 3.13E−04 | −5.72E−05 | 3.02E−06 | 2.11E−07 | 0 |

Figure 5A:
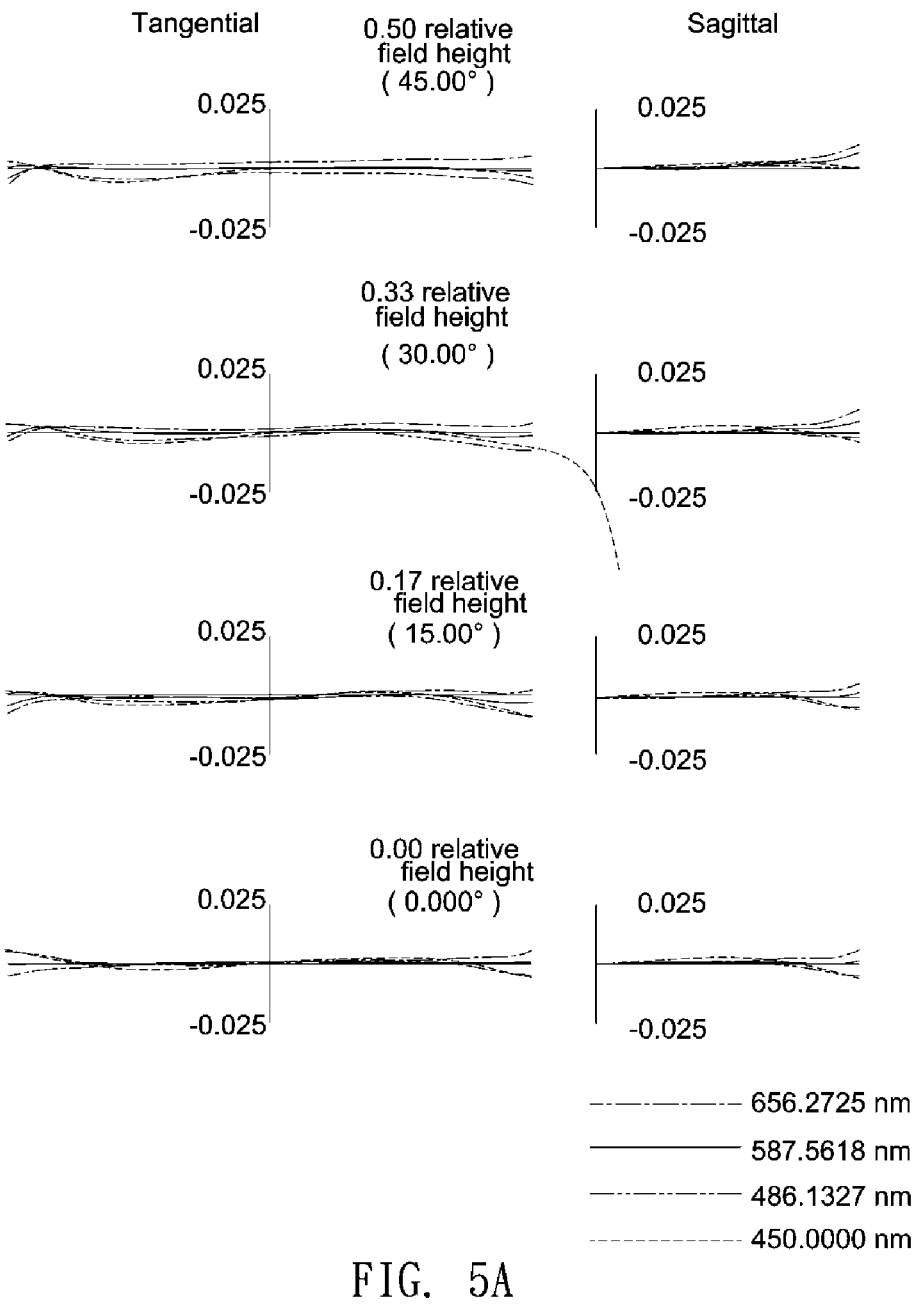
FIG. 5A and FIG. 5B show visible-light ray fan plots of the imaging lens shown in FIG. 4.
Figure 5B:
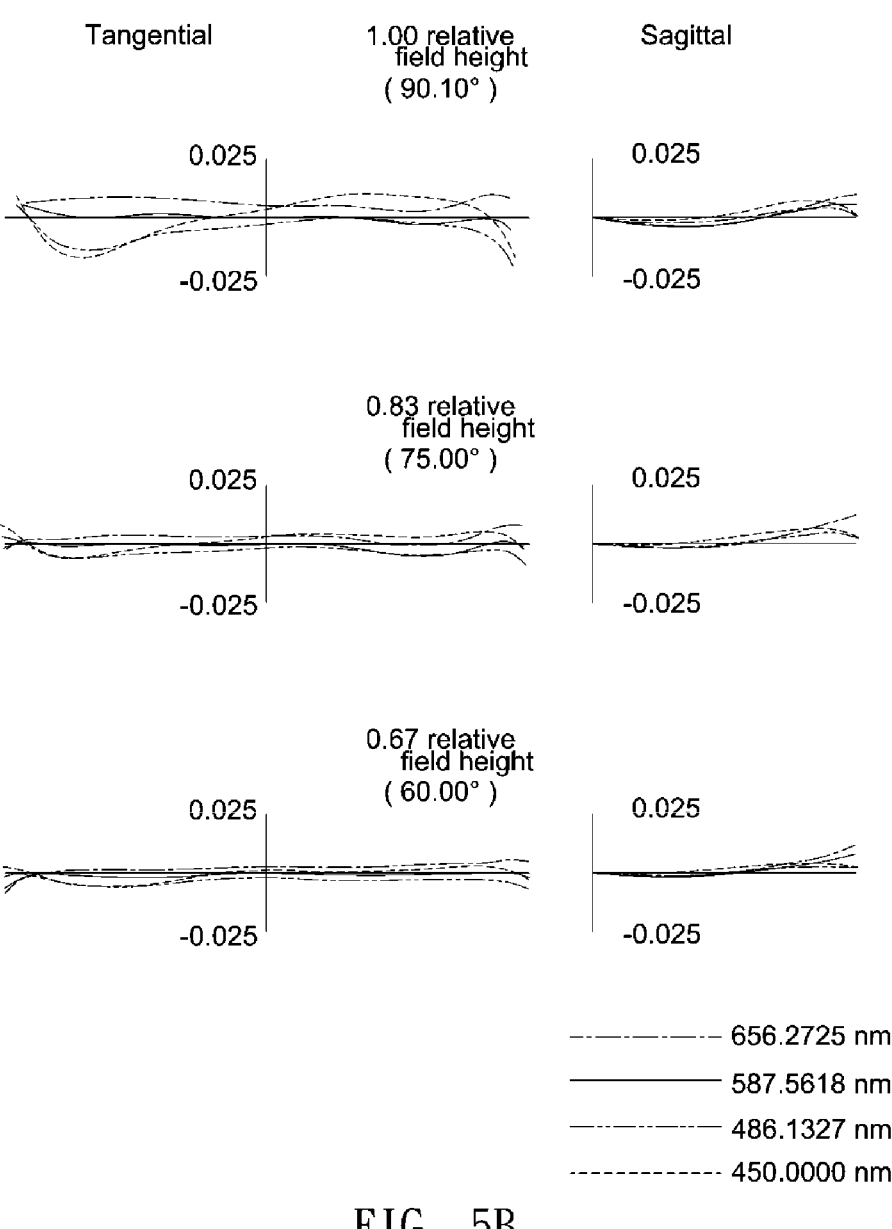
Figure 6A:
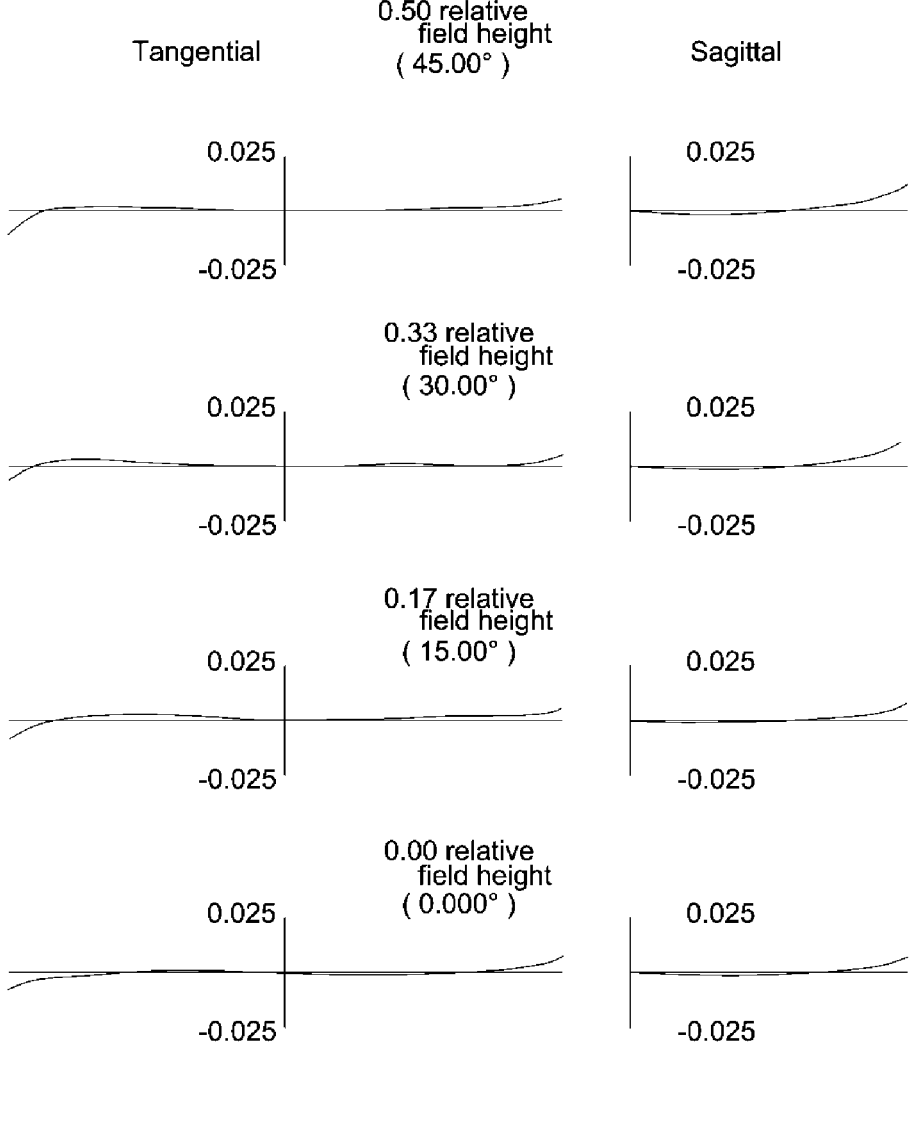
FIG. 6A and FIG. 6B show infrared-light ray fan plots of the imaging lens shown in FIG. 4.
Figure 6B:
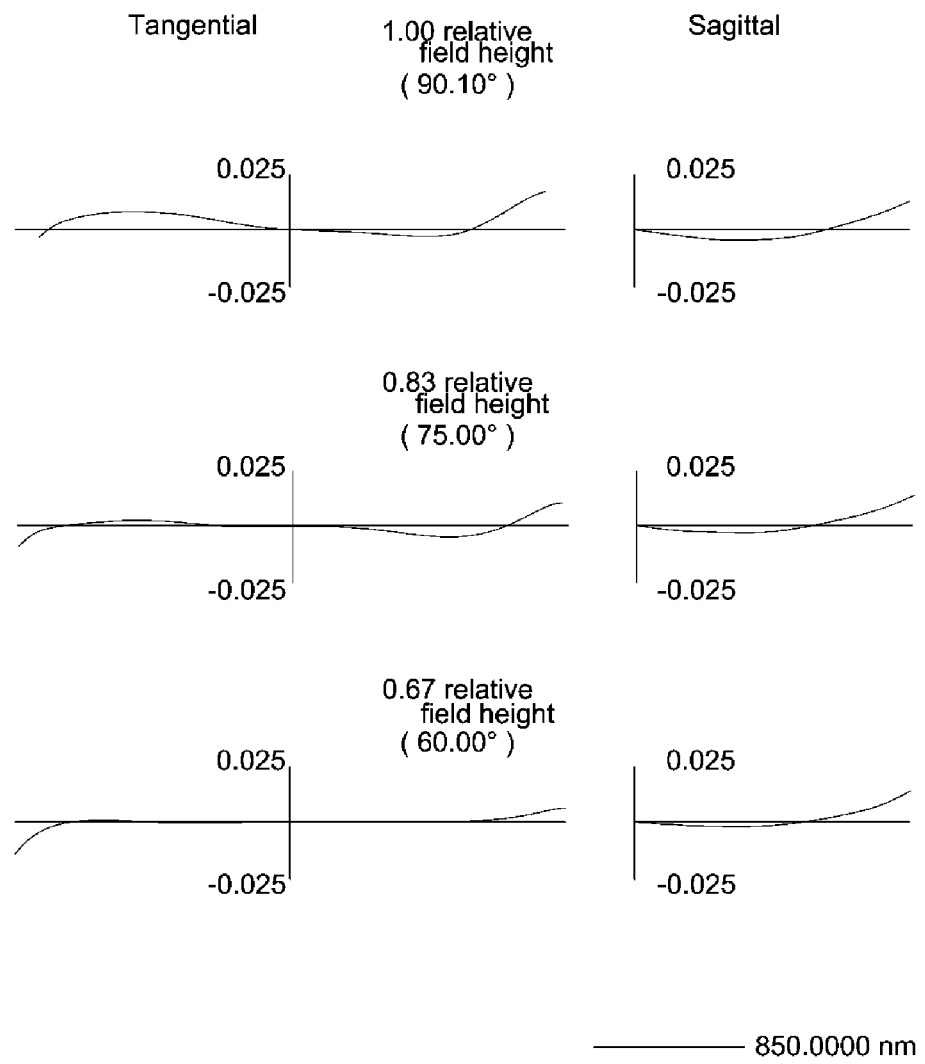

FIG. 5A, FIG. 5B, FIG. 6A and FIG. 6B show optical simulation results of the imaging lens 10b. FIG. 5A and FIG. 5B show ray fan plots for visible light, and FIG. 6A and FIG. 6B show ray fan plots for infrared light (850 nm), where an abscissa of the plot represents entrance pupil positions, and an ordinate of the plot represents relative numerical values of positions on an image plane where chief rays are projected. The optical simulation results for visible light and infrared light imaging shown in these plots are within permitted ranges specified by the standard, which indicates the above embodiment of the optical lens 10b may achieve good imaging quality for both visible and infrared light and may resolve the significant purple fringing during imaging.

form a doublet lens to reduce chromatic aberrations and improve the manufacturing yield rate of the imaging lens 10c.

In this embodiment, the imaging lens 10c consists essentially of six lenses with refractive powers. The diagonal field of view (DFOV) of the imaging lens 10c is 180 degrees, the semi-diagonal image height is 3.7 mm, the lens diameter D1 of the lens closest to the object side OS is 12.3 mm, the lens diameter DL of the lens closest to the image side IS is 9.78 mm, the total lens length LT is 11.56 mm, D1/LT=1.064, DL/LT=0.846, and LT/IMH=3.124.

Detailed optical data and design parameters of the lenses and other optical components of the imaging lens 10c are shown in Table 5.

TABLE 5

| Object description | Surface | Radius of curvature (mm) | Interval (mm) | Refractive index (nd) | Abbe number (Vd) |
|---|---|---|---|---|---|
| Lens L1(meniscus) | S1 | 12.308 | 0.65 | 1.70 | 55.5 |
| | S2 | 3.626 | 2.18 | | |
| Lens L2(aspheric) | S3 | 15.057 | 0.73 | 1.54 | 56.1 |
| | S4 | 2.071 | 1.68 | | |
| Lens L3(aspheric) | S5 | 3.835 | 0.81 | 1.65 | 21.5 |
| | S6 | 23.623 | 0.41 | | |
| Aperture stop 14 | S7 | INF | 0.78 | | |
| Lens L4(bi-convex) | S8 | 8.327 | 2.38 | 1.76 | 52.3 |
| Lens L5(meniscus) | S9 | −2.450 | 0.40 | 1.99 | 16.5 |
| | S10 | −4.706 | 0.88 | | |
| Lens L6(aspheric) | S11 | 4.780 | 0.65 | 1.54 | 56.1 |
| | S12 | 10.426 | 2.20 | | |
| cover plate 16 | S13 | INF | 0.7 | 1.52 | 64.1 |
| | S14 | | 1.14 | | |
| Image plane 18 | S15 | INF | 0 | | |

Table 6 shows the conic constant K and aspheric coefficients A-G for each aspheric surface of the imaging lens $10c$.

TABLE 6

| | K | A | B | C | D | E | F | G |
|---|---|---|---|---|---|---|---|---|
| S3 | 0 | −1.93E−03 | 1.42E−03 | −3.74E−04 | 5.34E−05 | −4.15E−06 | 1.31E−07 | 0 |
| S4 | 0 | 1.84E−03 | −4.97E−03 | 8.14E−03 | −5.29E−03 | 1.74E−03 | −2.63E−04 | 9.53E−06 |
| S5 | 0 | 7.05E−03 | 2.25E−03 | 1.21E−03 | −1.08E−03 | 6.55E−04 | −1.18E−04 | 0 |
| S6 | 0 | 1.25E−02 | −1.12E−02 | 2.27E−02 | −1.90E−02 | 8.61E−03 | −1.52E−03 | 0 |
| S11 | 0 | 5.51E−04 | −7.69E−04 | 2.94E−04 | −1.17E−04 | 1.48E−05 | −8.41E−07 | 0 |
| S12 | 0 | 7.18E−03 | −6.45E−04 | 2.51E−04 | −1.04E−04 | 1.12E−05 | −4.05E−07 | 0 |

Figure 8A:
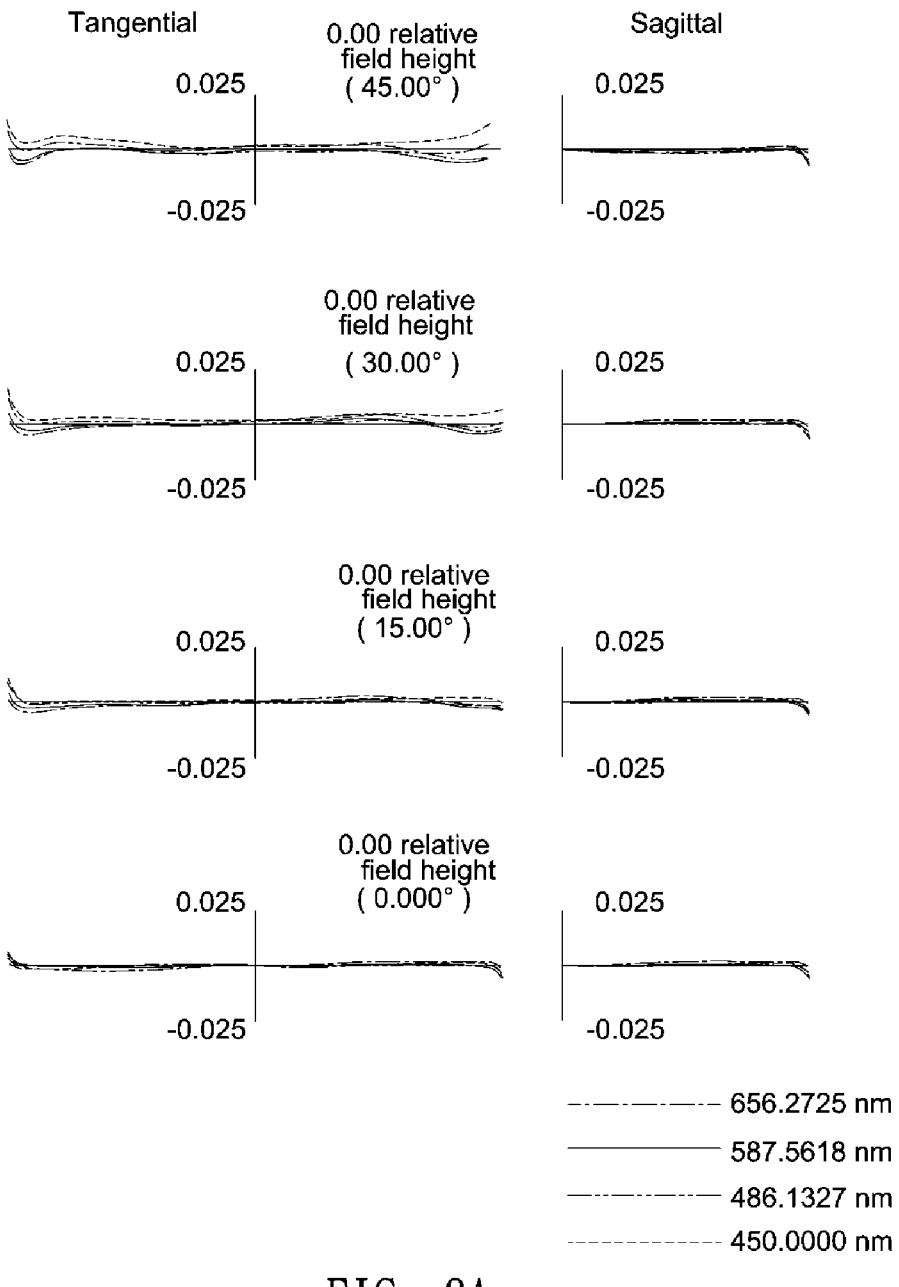
FIG. 8A and FIG. 8B show visible-light ray fan plots of the imaging lens shown in FIG. 7.
Figure 8B:
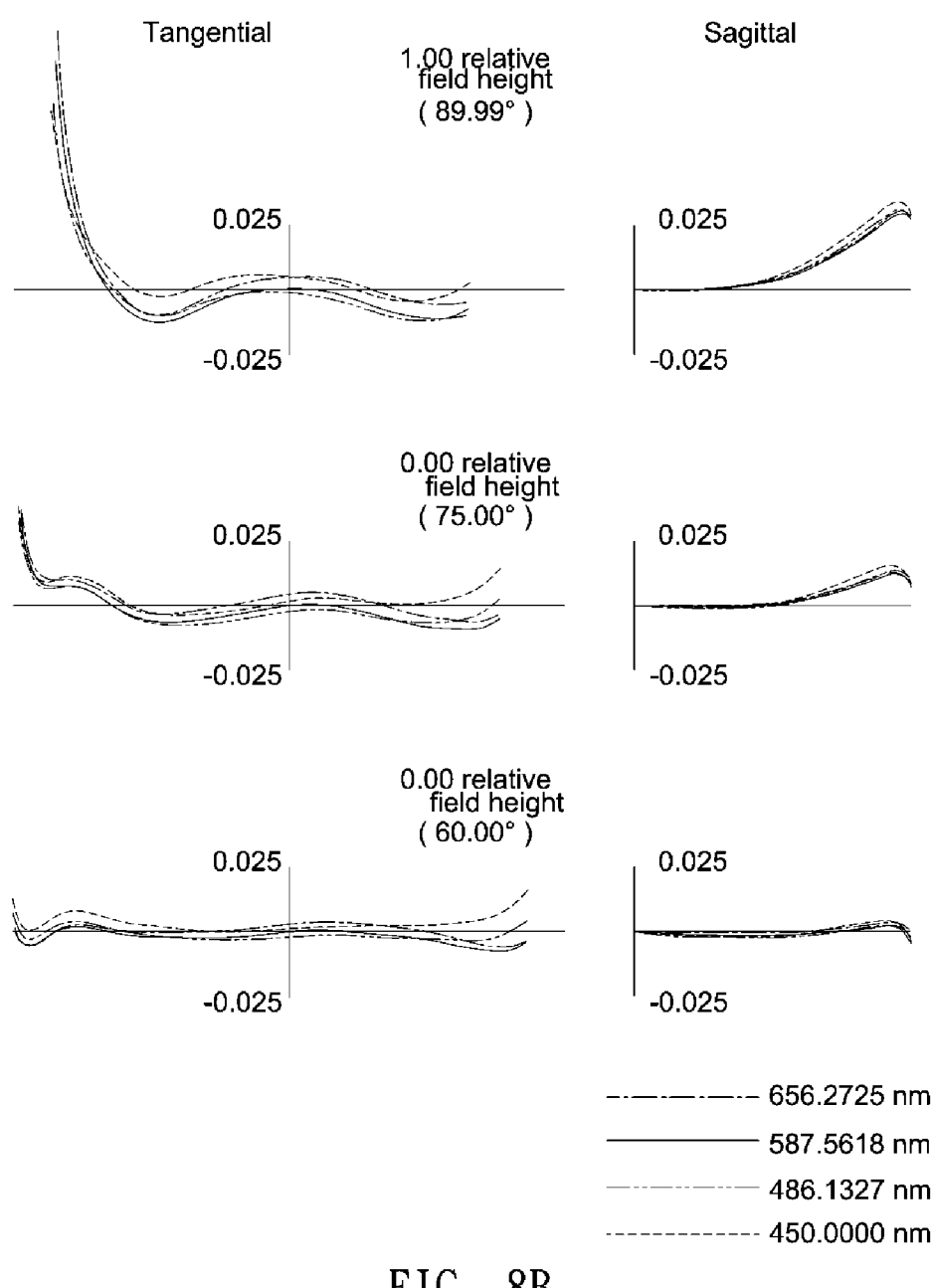
Figure 9A:
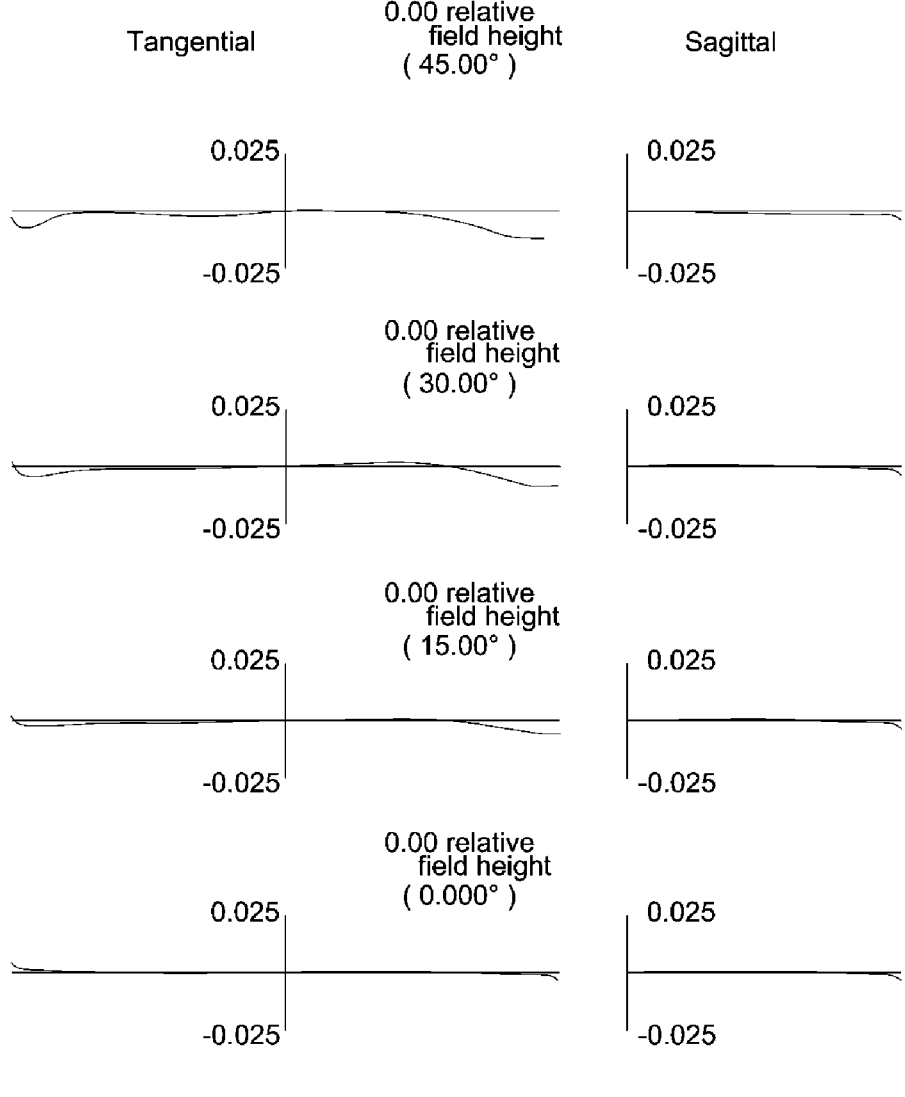
FIG. 9A and FIG. 9B show infrared-light ray fan plots of the imaging lens shown in FIG. 7.
Figure 9B:
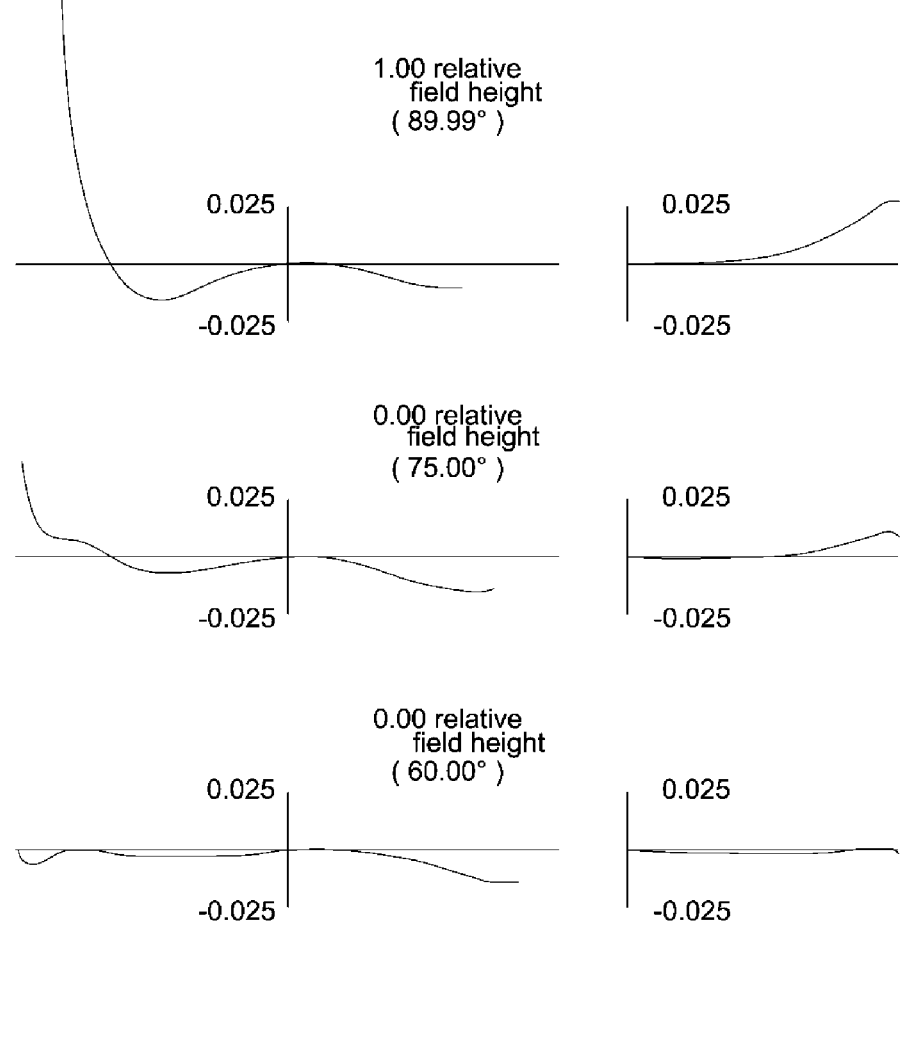

FIG. 8A, FIG. 8B, FIG. 9A and FIG. 9B show optical simulation results of the imaging lens $10c$. FIG. 8A and FIG. 8B show ray fan plots for visible light, and FIG. 9A and FIG. 9B show ray fan plots for infrared light (850 nm), where an abscissa of the plot represents entrance pupil positions, and an ordinate of the plot represents relative numerical values of positions on an image plane where chief rays are projected. The optical simulation results for visible light and infrared light imaging shown in these plots are within permitted ranges specified by the standard, which indicates the above embodiment of the optical lens $10c$ may achieve good imaging quality for both visible and infrared light and may resolve the significant purple fringing during imaging.

According to the above embodiments, meeting the designed characteristics and arrangement of optical components set forth in the above may, under the condition of possessing a wide field of view, achieve good imaging quality for both visible and infrared light imaging and may resolve the problem of significant purple fringing during imaging. Further, in various embodiments of the invention, the glass/plastic lenses and spherical/aspheric lenses are well matched to achieve a wide range of operating temperature, low fabrication costs and good imaging quality.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. An imaging lens, comprising:
a first lens group comprising three lenses with refractive powers, wherein two of three lenses of the first lens group are aspheric lenses; and
a second lens group comprising three lenses with refractive powers, wherein one of three lenses of the second lens group is an aspheric lens, other two lenses of the three lenses of the second lens group are paired to form a doublet lens, and the first lens group and the second lens group are divided from each other by an aperture stop;
wherein the imaging lens comprises six lenses with refractive powers, comprises at least two plastic lenses, and satisfies conditions of 3.0<LT/IMH<3.5 and 1.0<D1/LT<1.08, where IMH is a semi-diagonal image height of the imaging lens, D1 is a lens diameter of a lens closest to an object side of the imaging lens, and LT is a distance measured along an optical axis between two outermost lens surfaces with refractive powers at opposite ends of the imaging lens.

2. The imaging lens as claimed in claim 1, wherein the first lens group has a negative refractive power, and the second lens group has a positive refractive power.

3. The imaging lens as claimed in claim 1, wherein the imaging lens satisfies a condition of 0.76<DL/LT<1.02, where DL is a lens diameter of a lens closest to an image side of the imaging lens.

4. The imaging lens as claimed in claim 1, wherein a length measured from a lens surface closest to the object side to the aperture stop along the optical axis is greater than a length measured from a lens surface closest to an image side to the aperture stop along the optical axis.

5. The imaging lens as claimed in claim 1, wherein the lens closest to the object side of the imaging lens is a glass spherical lens with a negative refractive power.

6. The imaging lens as claimed in claim 1, wherein the doublet lens is closest to an image side of the imaging lens as compared with any other lens of the second lens group.

7. The imaging lens as claimed in claim 1, wherein a distance between a focal plane for blue-violet light with a wavelength of 450 nm and a focal plane for visible light with a wavelength of 555 nm along the optical axis is no more than 10 um.

8. The imaging lens as claimed in claim 1, wherein a diagonal field of view of the imaging lens ranges from 170 degrees to 220 degrees.

9. The imaging lens as claimed in claim 1, wherein a distance between a focal plane for infrared light with a wavelength of 850 nm and a focal plane for visible light with a wavelength of 555 nm along the optical axis is no more than 15 um.

10. The imaging lens as claimed in claim 1, wherein a total track length of the imaging lens ranges from 14.6 mm to 16 mm.

11. An imaging lens, comprising:

a first lens, a second lens, a third lens, a fourth lens, a fifth lens and a sixth lens with refractive powers arranged in order from an object side to an image side of the imaging lens, wherein the second lens, the third lens, the fifth lens and the sixth lens are aspheric lenses, the fifth lens and the sixth lens are paired to form a doublet lens, the first lens is closest to the object side among all lenses of the imaging lens, the sixth lens is closest to the image side among all lenses of the imaging lens, and the imaging lens satisfies conditions of $3.0 < LT/IMH < 3.5$ and $1.0 < D1/LT < 1.08$, where IMH is the semi-diagonal image height, D1 is a diameter of the first lens, LT is a length measured along an optical axis of the imaging lens from an object-side surface of the first lens to an image-side surface of the sixth lens.

12. The imaging lens as claimed in claim 11, wherein the imaging lens satisfies a condition of $0.76 < DL/LT < 1.02$, where DL is a lens diameter of the sixth lens.

13. The imaging lens as claimed in claim 11, wherein a length measured from the object-side surface of the first lens to the aperture stop along the optical axis is greater than a length measured from the image-side surface of the sixth lens to the aperture stop along the optical axis.

14. The imaging lens as claimed in claim 11, wherein the first lens is a glass spherical lens with a negative refractive power.

15. The imaging lens as claimed in claim 11, wherein the doublet lens is a cemented doublet.

16. The imaging lens as claimed in claim 11, wherein a distance between a focal plane for blue-violet light with a wavelength of 450 nm and a focal plane for visible light with a wavelength of 555 nm along the optical axis is no more than 10 um.

17. The imaging lens as claimed in claim 11, wherein a diagonal field of view of the imaging lens ranges from 170 degrees to 220 degrees.

18. The imaging lens as claimed in claim 11, wherein a distance between a focal plane for infrared light with a wavelength of 850 nm and a focal plane for visible light with a wavelength of 555 nm along the optical axis is no more than 15 um.

19. The imaging lens as claimed in claim 11, wherein a total track length of the imaging lens ranges from 14.6 mm to 16 mm.

20. The imaging lens as claimed in claim 11, further comprising a cover plate arranged on the image side of the imaging lens.

\* \* \* \* \*